United States Patent Office 3,377,308
Patented Apr. 9, 1968

3,377,308
TWO-STEP PROCESS FOR THE PRODUCTION OF SOLUTIONS OF SEGMENTED POLYURETHANE POLYMERS
Harald Oertel and Heinrich Rinke, Leverkusen, and Wilhelm Thoma, Cologne-Flittard, Germany, assignors to Farbenfabriken Bayer Aktiengsellschaft, Leverkusen, Germany, a German corporation
No Drawing. Filed Sept. 3, 1963, Ser. No. 306,271
Claims priority, application Germany, Sept. 4, 1962, F 37,740
22 Claims. (Cl. 260—32.6)

ABSTRACT OF THE DISCLOSURE

Highly elastic segmented polyurethanes are prepared by reacting in an inorganic solvent for polyacrylonitrile a linear NCO terminated prepolymer from a linear dihydroxy compound having a molecular weight of from about 650 to about 5000 and an aromatic diisocyanate with an excess of a hydrazide or a hydrazine, reacting the polymer thus formed with an organic polyisocyanate having NCO groups of a reactivity less than that of an unhindered NCO group bonded to a benzene ring, the quantity of the last added isocyanate being up to that equivalent to react with all of the reactive groups.

---

This invention relates to polyurethane polymers and a method of preparation; more particularly, it relates to a method of preparing highly elastic polymers capable of being shaped from solution.

It is known that isocyanate modified polyhydroxyl compounds with terminal —NCO groups (hereinafter termed —NCO prepolymers) may be reacted in highly polar solvents, such as, dimethylformamide, with diamines, hydrazines or dihydrazide compounds to produce viscous solutions of substantially linear polymers which may be shaped from the solution to elastic fibers and foils. The reaction products of aliphatic diamines, hydrazines and dihydrazide compounds with isocyanate modified polyhydroxyl compounds which carry terminal aromatic —NCO groups lead, in particular, to polymers with good elastic properties.

The reaction of —NCO prepolymers based on aromatic diisocyanates with aliphatic diamines gives rise to difficulties owing to the extremely high reaction velocity, because this frequently leads to premature expansion of the reaction components. By using dihydrazide compounds the reaction velocity is considerably reduced, but it has been found that the preparation of polymer solutions with high viscosities of about 300 to 700 P/20° at concentrations of about 23% to 32% solids content is difficult to reproduce on a commercial scale because it is generally necessary to have an equivalent reaction of the two reaction components, that is, the —NCO prepolymer and the dihydrazide compound.

The reaction between the polyhydroxyl compound which contains terminal isocyanate groups and the chain lengthening agent to produce high molecular polymers may be carried out in relatively dilute solution if special precautions are taken, but it is generally necessary subsequently to increase the concentration by distilling off a part of the solvent in order to obtain a viscosity of at least 300 P/20° in order that the product may be used in the dry spinning process, which is the preferred process for producing highly elastic fibers. This stage adds considerably to the difficulty of the process, particularly owing to the varying relationship between the concentration and the viscosity in the polymer solutions and owing to the fact that deposits are easily formed on concentrating the polymer solution, which deposits interfere with the spinning process.

The main reasons why it is very difficult to reproduce the process for the direct production of highly concentrated and highly viscous spinning solutions are the following.

Polyhydroxyl compounds vary greatly in their reactivity with polyisocyanates because they are strongly influenced, in a manner which can only be slightly controlled, by the catalytic action of impurities, mainly traces of metals and alkalies. This is further complicated by the fact that the reaction between polyhydroxyl compounds and diisocyanates not only leads to the formation of linear reaction products but at the same time may be accompanied by isocyanate reactions in which a branched structure in the —NCO prepolymer product is formed, the extent to which this takes place depending greatly on the reaction temperature and reaction time.

Furthermore, the —NCO content in these —NCO prepolymers constantly falls if the product is left to stand at room temperature. This reduction in the —NCO content is particularly marked in solutions in dimethylformamide because dimethylformamide is not completely inert to —NCO groups.

Another difficulty in the use of aliphatic diamines and/or hydrazine as chain lengthening agents is that they rapidly react at room temperature with dimethylformamide, splitting off dimethylamine and thus reducing the functional capacity of the chain lengthening agent.

Owing to the relatively high reaction velocity or aromatic diisocyanates with the above mentioned chain lengthening agents, gelling may easily occur at the points of contact between the reaction components as the reaction solution increases in viscosity if the reaction components are not mixed sufficiently rapidly. This is particularly liable to occur with branched —NCO addition products, which are otherwise particularly suitable for obtaining highly elastic end products.

It has been observed from time to time that even when the reaction components are used in the correct proportions and the reaction conditions are carefully controlled, considerable variations in the viscosity of the polymer solutions occur.

It has already been mentioned in German patent specification 1,123,467 that when dihydrazide compounds are used in slight excess above the quantity corresponding to the —NCO content, a lower molecular weight is obtained and the viscosities of the solutions are not sufficiently high for the dry spinning process. The reduction in the molecular weight of the polymers also has an unfavorable effect on their thermostability.

It is, therefore, an object of this invention to overcome the aforementioned disadvantages. It is another object to provide an improved method of making highly elastic polyurethane polymers. It is another object of this invention to provide a method of preparing polyurethane polymers free of non-homogeneous products. It is another object of this invention to provide a method that takes place slowly and is easily controlled. It is a further object of this invention to provide shaped polyurethane plastic articles which are spun from solution.

The foregoing objects and others which will become apparent from the following description are accomplished in accordance with the invention, generally speaking, by providing polyurethane polymers prepared by reacting an —NCO terminated, substantially linear prepolymer prepared by reacting an excess of an aromatic diisocyanate with a substantially linear dihydroxy organic polymer having a molecular weight of from about 650 to about 5000 with an excess of a hydrazide or hydrazine, the reaction occurring in a polar solvent, and reacting the product thereof with an organic polyisocyanate, the isocyanate groups of which have a reactivity less than that of an unhindered —NCO group bonded to a benzene ring. Thus, the invention contemplates reacting in a polar solvent an —NCO terminated prepolymer with an excess of a hydrazide or hydrazine to obtain a polymer having terminal —NH—NH$_2$ groups and reacting the polymer thus formed with an organic polyisocyanate having a reactivity less than that of the aromatic diisocyanate used in the preparation of the prepolymer and in an amount less than sufficient to react with all the hydrazide group present.

In accordance with this invention, starting from —NCO prepolymers and excess quantities of dihydrazide compounds in solution, only polymers with low molecular weight and, therefore, low viscosity are normally obtained. The viscosity and molecular weight may easily be increased to the desired values by subsequent addition of less reactive polyisocyanates. The surprising fact is that this reaction with relatively unreactive diisocyanates of low molecular weight produced high molecular weight polymers that have the same good elastic properties as those in which the —NCO prepolymers have been treated with equivalent quantities of hydrazide. This, therefore, makes possible the obtaining of highly viscous solutions with polymers of the desired molecular weight by subsequent addition of relatively unreactive polyisocyanates, the reaction taking place slowly and being easily controllable and there being no risk of non-homogeneous products being formed.

The reaction according to the invention differs from the known cross-linking reaction which takes place with excess quantities of polyisocyanates at elevated temperatures (60° to 130°) with the formation of allophanate and biuret groups by the fact that it is carried out at room temperature or slightly elevated temperatures, e.g. 25–60° C., with no more than equivalent quantities of isocyanate.

In accordance with this invention, the manufacture of highly elastic polymers that can be shaped from solution by the isocyanate polyaddition process from high molecular weight polyhydroxyl compounds, polyisocyanates and difunctional chain lengthening agents with —NH—NH$_2$ end groups is characterized by the following sequence of reactions:

(a) Reaction of substantially linear polyhydroxyl compounds with a molecular weight of 650 to 5,000 with an excess of aromatic diisocyanates to form a compound with terminal —NCO groups.

(b) Reaction of the product that contains —NCO groups, in polar solvents, with an excess of chain lengthening agents having —NH—NH$_2$ groups.

(c) Reaction of the reaction products which contain terminal —NH—NH$_2$ groups with another polyisocyanate which is less reactive than the aromatic diisocyanate in Stage (a), in such quantities that at the most all the —NH—NH$_2$ end groups are used up.

If, in Stage (c), the —NH—NH$_2$ end groups are reacted with less than the equivalent quantities of the more unreactive polyisocyanates, it has been found advisable to treat the remaining —NH—NH$_2$ end groups subsequently with monofunctional acylating compounds, such as, monoisocyanates, acid anhydrides or pyrocarbonic acid esters. This has a particularly favorable effect on the thermostability of the products.

The manufacture according to this invention of the highly elastic polymers by the above described sequence of reactions has a number of advantages, particularly from a technical point of view.

Apart from a varying amount of branched chains within the —NCO prepolymer, due to the influence of catalysts, or other variable reaction conditions in the reaction between polyhydroxyl compounds and excess quantities of aromatic diisocyanates in Stage (a), the reaction in Stage (b) of —NCO prepolymers with quantities of difunctional hydrazide compounds present, in excess of the number of —NCO groups present, produces solutions of polymers with hydrazide end groups and lower viscosity. These solutions are not suitable for dry spinning processes. However, this reaction is easy to carry out because of the excess of dihydrazide compounds breaking up the polymer chains and thus the risk of a non-homogeneous cross-linking reaction is practically eliminated.

The reaction between the —NCO prepolymer and the chain lengthening agents may now be carried out in simple vessels equipped with stirrers but even if the process is carried out continuously, a number of advantages is obtained.

The most important advantage lies in Stage (c) of the process. In the processes hitherto carried out, cross linked swollen or jelly-like substances are easily formed at the point of contact between the aromatic diisocyanates and the hydrazide compounds when the components are mixed owing to the high reaction velocity, particularly towards the end of the reaction when viscous solutions are already formed, but in the new process the increase in the molecular weight of the polymers and the increase in the viscosity of the solution occur more slowly owing to the addition of less reactive diisocyanates in Stage (c), so that this increase in viscosity and molecular weight can more easily be controlled.

If, for example, hexamethylene-1,6-diisocyanate is used for the reaction with polymers containing hydrazide end groups in Stage (b), the substances may be completely mixed together simply by stirring, and the viscosity begins to increase only after several minutes and this increase in viscosity is completed after about 30 to 45 minutes.

By adding the diisocyanates in stages in quantities not greater than those equivalent to the hydrazide end groups, it is possible to adjust the viscosity and the molecular weight to the desired value. Since the polymer which contains hydrazide end groups is stable when stored at room temperature or slightly elevated temperature, the relatively low molecular weight polymers obtained in Stage (b) may be processed any later time to a highly viscous solution with good spinning properties and high molecular weight by the process of Stage (c).

Owing to the relative slowness of this "processing reaction," it is still possible even in Stage (c) to influence or interfere with the reaction with diisocyanates, which increases the viscosity. Thus, should the viscosity rise above the expected value, the reaction may easily be stopped by adding compounds which react rapidly with diisocyanates, e.g., monofunctional aliphatic amines, such as, for example, ethylamine, propylamine, butylamine, octylamine, and the like.

By the sequence of reactions in accordance with the invention, the production of viscous spinning solutions, preferably with viscosities of at least 300 P/20° at concentrations of 20% to 34% may be well controlled.

A polymer of the structure obtained by the present invention cannot be obtained by the simultaneous use of polyisocyanates of graded activity in the reaction with high molecular weight polyhydroxy compounds followed by the reaction with dihydrazide compounds, e.g., according to the process described in German patent specification 1,123,467.

A number of starting materials are suitable for the preparation of isocyanate modified polyhydroxyl compounds with terminal —NCO groups in Stage (a), such as, for example, dihydroxyl polyesters, polyester amides, polyalkylene etherglycols, polythioetherglycols, dihydric polycarbonates and dihydric polyacetals which are substantially linear in structure. By "substantially linear" is meant that the polymers have a functionality of two or only slightly above two as, for example, when only a small amount of higher functional material is used in its preparation. The high molecular weight polyhydroxyl compounds generally have a molecular weight 600 to 5,000 and melting points below 60°, preferably below 45°.

Elastomers with good elastic properties, particularly at low temperatures, may be obtained from these low melting or liquid polyhyroxyl compounds. By using starting materials which contain halogen and/or phosphorous, flame-resistant polymers can be obtained. Any suitable polyester may be used; such as, for example, those illustrated below may be used in the process of this invention. Specific examples are polyesters or polyester amides such as are obtained by known methods. They may be produced from polyfunctional, preferably difunctional alcohols, amino alcohols, hydroxycarboxylic acids, lactones, aminocarboxylic acids, lactams, cyclic carbonates and polycarboxylic acids. Their molecular weight and the number and type of end groups may be varied by suitable choice of the proportions of the components. To lower the melting point of the polyhydroxyl compounds, mixtures of the above mentioned compounds may be used or they may be modified by reaction with less than molar quantities of diisocyanate. For example, polyesters may be reacted with diisocyanates, e.g., with toluylene diisocyanates, in molar ratios of about 2:1 to 3:1 to produce polyester urethanes with terminal hydroxyl groups.

Examples of such polyesters are polyesters of adipic acid and ethylene glycol, butanediol, pentanediol, hexanediol, mixtures of ethylene glycol and propylene glycol, hexanediol and methyl-hexanediol, hexanediol and 2:2-dimethylpropanediol-1,3, hexanediol, butanediol and pentanediol or polyester amides of hexanediol and piperazine. Any suitable glycol, aminoalcohol, lactone, lactam aminocarboxylic acid, hydroxy carboxylic acid, and the like may be used, such as, for example, 1,3- and 1,4-cyclohexanediol or 1,3- and 1,4-dihydroxymethylcyclohexane, ethylene glycol, propylene glycol, 1,4- and 1,3-butane diol, pentanediol, hexanediol, and the like, amino alcohols, such as, aminoethanol, aminopropanol, semilactones, such as, caprolactone or substituted caprolactones, butyrolactone, lactams, such as, caprolactam, pyrrolidone or aminocarboxylic acids, such as, ω-aminocaproic acid, ω-aminooctanic acid, ω-aminoundecanic acid and their lactoms, glycollic acid and the like.

Higher functional compounds, such as, trimethylolethane, trimethylolpropane or hexanetriols may be used to a less extent. Any suitable carboxylic acid, such as, for example, glutaric acid, pimelic acid, suberic acid, adipic acid, methyladipic acid, succinic acid, sebacic acid, oxalic acid, phthalic acid, maleic acid, fumaric acid, citraconic acid, itaconic acid, isosebacic acid, which is a mixture of $C_{10}$-dicarboxylic acids, ricinoleic acid and aliphatic dicarboxylic acids containing hetero-atoms, such as, thiodipropionic acid, as well as cycloaliphatic dicarboxylic acids, such as, 1,3- or 1,4-cyclohexane-dicarboxylic acids, terephthalic acid and isophthalic acid may be used.

Owing to the fact that they are much stable to hydrolysis, it is preferred to use polyesters obtained from components with at least 5 carbon atoms, for example, from adipic acid and 2,2-dimethylpropanediol or mixtures of hexanediol-1,6 with 2,2-dimethylpropanediol or the mixture of 2(3)-methylhexanediols-1,6. These esters may be converted into polyester urethanes with diisocyanates, particularly toluylene diisocyanate.

Polyalkylene etherglycols with terminal hydroxyl groups such as are obtained by the addition of alkylene oxides to water, glycols, diamines, trifunctional alcohols or amino alcohols, and particularly polytetramethylene-glycol ether obtained by polymerization of tetrahydrofuran with acid catalysts or the corresponding copolymers with low percentages of ethylene oxide units or propylene oxide units are suitable starting components. Any suitable alkylene oxide may be used, such as, for example, ethylene oxide, propylene oxide, butylene oxide, styrene oxide and the like. Any suitable glycol, such as, those mentioned above, may be used. Any suitable diamine amino alcohol, trifunctional alcohol may be used, especially those yielding bifunctional essentially linear derivatives, such as N,N'-dimethyl ethylene diamine, N,N'-diethyl hexamethylene diamine, N-methyl ethanol amine and the like; others such as ethylene diamine, amino aniline, diamino cyclohexane and the like, trimethylol propane and the like, can be used concurrently to a minor extent. The polyethers may be prepared by any known process, such as, for example, the process described by Wurtz in 1859 and in the Encyclopedia of Chemical Technology, volume 7, pages 257–262, published by Interscience Publishers in 1951 or in U.S. Patent 1,922,459. Any suitable polyacetal may be used, such as, for example, those obtained according to German patent specification 1,039,744 and 1,045,095 from polyalcohols and formaldehyde or according to U.S. patent specification 2,870,097, as well as polyester acetals obtained from formaldehyde and diols which contain ester groups. Further, other suitable aldehydes, such as, paraldehyde, butyraldehyde and the like, may be used. Any of the glycols mentioned above may be used.

Any suitable polythioethers, such as, those obtained by condensation of thiodiglycol, 3,3'-dihydroxy propyl sulfide, 4,4'-dihydroxy butylsulfide, 1,4-(b-hydroxyethyl) phenylene dithioether and the like, either with itself or with other polyalcohols, e.g., according to German patent specification 1,039,232 are also suitable reaction components. These thio-compounds can also be condensed with alkylene oxides, such as, those mentioned above. It is often advantageous to modify the products in many cases with less than equivalent amounts of diisocyanate.

The preferred range of molecular weight of the polyhydroxyl compounds which are subjected to further reaction with polyisocyanates to form prepolymers containing isocyanate end groups lies between 1,000 and 3,500. Polyhydroxyl compounds with a molecular weight of only about 600 to 1,000 may also be used if they are reacted with less than molar quantities of diisocyanates, these polyhydroxyl compounds, which contain urethane groups, being then used as starting components for the reaction with the excess polyisocyanate.

In a modification one may use in addition to the high molecular weight substantially linear polyhydroxyl compounds, small quantities of low molecular weight higher functional compounds, e.g., trifunctional alcohols, such as, trimethylol propane, for the reaction with the diisocyanates. The quantity of trifunctional compound added should preferably correspond to not more than 5% of the OH number of the polyhydroxyl compound.

About 0.5% to 5% of high molecular weight silicone compounds, such as, dimethylpolysiloxanes, particularly organo functional compounds which contain terminal OH, $NH_2$ or COOH groups can be capable of being incorporated into the elastomers to render then hydrophobic, thus improving the property of hydrolysis.

Any suitable aromatic diisocyanate may be used for forming the —NCO prepolymers. Symmetrical diisocyanates, such as, diphenylmethane-4,4'-diisocyanate, diphenyl-4,4'-diisocyanate, diphenyldimethyl-methane-4,4'-diisocyanate, dibenzyl-4,4'-diisocyanate, stilbene-4,4'-diisocyanate, benzophenone - 4,4' - diisocyanate, diphenylether- or diphenylsulphide-4,4'-diisocyanate and their derivatives substituted with alkyl-, alkoxyl- or halogen or nitro groups, e.g., 3,3'-dimethyldiphenyl-4,4'-diisocyanate or 3,3'-dichlorodiphenylmethane-diisocyanate are particularly preferred. Diisocyanates of the naphthalene series or heterocyclic diisocyanates, e.g., dibenzofuran, as well as toluylene-2,4- or 2,6-diisocyanate or diisocyanates which contain urea groups of uretdione groups may also be mentioned as examples. Diphenylmethane-4,4'-diisocyanate and its substitution products are preferred components.

The polyhydroxyl compounds may be reacted alone or in admixture with the aromatic diisocyanates. Preferably about 1.5 to 3.5 mols, preferably 1.6 to 2.1 mols of diisocyanate are used per mol of polyhydroxyl compound.

The polyhydroxyl compound may, if desired, be dewatered by heating for about 1 hour at 100° to 130° C. in vacuo at 6 to 50 mm. Hg, and its reaction with the diisocyanates is then preferably carried out in the melt at about 80° to 130° C., preferably 90° to 110° C., or it may be carried out in inert solvents, such as, methylene chloride, carbon tetrachloride, benzene, chlorobenzene, methyl ethyl ketone, tetrahydrofuran, dioxane, glycol monomethyl ether acetate or glycol formal, if desired in the presence of catalysts.

When the reaction is carried out in solvents, the solvents may be distilled off as the reaction progresses (e.g., in the case of methylene chloride), or the —NCO prepolymer may remain dissolved in the solvents (e.g., in the case of dioxane) since in general these solutions of the —NCO prepolymers are easier to handle owing to their lower viscosity. At elevated temperatures (80° to 100° C.) the melts of the —NCO prepolymers free from solvents, have viscosities which make it possible to dissolve or mix the product rapidly in the subsequent reaction in Stage (b).

The preparation of the —NCO prepolymer product is preferably carried out continuously. Dosed quantities of polyhydroxyl compounds and diisocyanates in the solid form or in solution may be carried out through a heated reaction zone in which the reaction temperature and the duration of dwell influence the formation of the —NCO prepolymer. If readily volatile solvents, such as, methylene chloride, are used in this reaction, they may be removed subsequently, e.g., over a thin-layer evaporator, if desired in vacuo. The prepolymer heated to about 80° to 120° C. may then be supplied continuously at a measured rate to the next reaction stage.

The reaction of the —NCO preliminary addition product with excess quantities of chain lengthening agents is carried out in highly polar solvents at room temperature or temperatures up to about 100° C.

Any suitable polar solvent known to dissolve polyacrylonitrile may be used, such as, for example, dimethylformamide, dimethylacetamide, dimethylsulphoxide, hexamethylphosphoramide, tetramethylenesulphone, N-methylpyrrolidone or tetramethylurea which may be diluted with other inert solvents, such as, acetone, methyl ethyl ketone, ethyl acetate, tetrahydrofuran, dioxan, glycolmonomethylether acetate or glycol formal.

Any suitable hydrazide compounds for the chain lengthening reaction with the —NCO preliminary addition products may be used, such as, those mentioned in U.S. patent applications Serial Nos. 129,964, 246,327, now U.S. Patent No. 3,305,533, and 296,093.

Any hydrazide having the formula

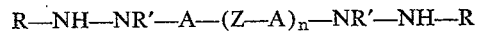

R—NH—NR'—A—(Z—A)$_n$—NR'—NH—R where A is a group selected from CO, CS and SO$_2$; R and R' each represent a hydrogen atom, an alkyl radical or an aryl radical, with the proviso that at least twice in the molecule R and R' represent a hydrogen atom; Z is an alkylene radical, the chain of which may be interrupted by one or more hetero atoms, such as, oxygen and sulfur, an arylene radical, an aralkylene radical, an NH— or NH—NH group, an O—Y—O or an NH—Y—NH group, wherein Y in the last two formulae is a divalent organic radical, and $n$ is an integer selected from 0 and 1, or the formula:

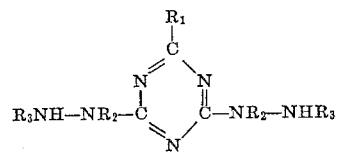

wherein R$_1$ is hydrogen, chlorine, —OR$_2$, —NR$_2$R$_3$, alkyl, aryl, aralkyl, cycloalkyl; and R$_2$ and R$_3$ are hydrogen, alkyl, aryl, aralkyl or cycloalkyl.

Any suitable alkyl radical may be represented by R$_1$, R$_2$ or R$_3$, such as, for example, methyl, ethyl, propyl, isopropyl, butyl, isobutyl, sec-butyl, tert.-butyl, amyl and the various positional isomers thereof; the corresponding straight and branched chain isomers of hexyl, heptyl, octyl, nonyl, decyl, undecyl, dodecyl, pentadecyl, nondecyl and the like. Any suitable aryl radical may be represented by R$_1$, R$_2$ or R$_3$, such as, for example, phenyl, naphthyl, anthryl and the like. Any suitable aralkyl radical may be represented by R$_1$, R$_2$ and R$_3$, such as, for example, benzyl, phenylethyl, phenylpropyl, phenylisopropyl, phenylbutyl, phenylisobutyl, naphthylmethyl, naphthylethyl and the like. Any suitable cycloalkyl radical may be represented by R$_1$, R$_2$ and R$_3$, such as, for example, cyclopropyl, cyclobutyl, cycloamyl, cyclohexyl, cycloheptyl, cyclooctyl and the like. In the formula above, R$_2$ and R$_3$ may be alike or different.

The following substances may be mentioned as examples: carbodihydrazide, N,N'-dimethylcarbodihydrazide, 1,5-diphenylcarbodihydrazide, adipic acid dihydrazide, thiocarbodihydrazide, thiodipropionic acid dihydrazide, tartaric acid dihydrazide, dicarboxylic acid dihydrazides which contain ether groups, for example, the dihydrazide of diglycollic acid or of -oxapimelic acid as well as isophthalic acid dihydrazide, disemicarbazides, such as, tetramethylene-disemicarbazide, hexamethylene-disemicarbazide, dihydrazincarboxylic acid esters of glycols, such as, butanediol dicarbazine ester, and furthermore sulphodihydrazide, 1,3- or 1,4-phenylene-disulphonic acid dihydrazide and N,N-diaminobiuret or hydrazodicarboxylic acid dihydrazide and mixtures of hydrazide compounds and the like, cyanuric acid-1-chloride-3,5-dihydrazide (s-triazine-1-chloro-3,5-dihydrazine), s-triazine-1,3-dihydrazine cyanuric acid - 3,5 - dihydrazide, cyanuric acid - 1-methyl ester - 3,5 - dihydrazide, 1 - amido - cyanuric acid - 3,5 - dihydrazide, 1 - (N - phenylamido) - cyanuric acid - 3,5 - dihydrazide, 1 - (N,N - diethylamido) - cyanuric acid - 3,5 - dihydrazide, 1 - (N - methyl - N - phenylamido) - cyanuric acid - 3,5 - dihydrazide, 1 - phenyl - s-triazine-3,5-dihydrazine, 1-isopropyl-s-triazine-3,5-hydrazine and the like. These may be used for the chain lengthening reaction.

Carbodihydrazide is especially preferred.

Another class of suitable chain-lengthening agent with NH—NH$_2$— end groups are the hydrazines. To be mentioned are, for instance, hydrazine, methylhydrazine, ethyl hydrazine, propyl hydrazine, isopropyl hydrazine, octyl hydrazine, N,N'-diamino piperazine, cyclohexyl hydrazine, carbazinic acid. These can be used alone or in admixture with the above hydrazides as chain-lengthening agent.

If it is desired to modify the properties of the polymers, other chain lengthening agents may be added in smaller quantities, such as, aliphatic diamines, in addition to the hydrazide compounds or hydrazines. One may also use difunctional compounds which contain terminal amino- or hydrazide groups, e.g., ω-aminocaproic acid hydrazide, ω-aminobutyric acid hydrazide or ω-aminooctylsemicarbazide.

Monofunctional hydrazide- or amino compounds or trifunctional hydrazide- and/or amino compounds may also be used in smaller quantities to regulate the molecular weight.

The reaction products built up from —NCO prepolymers and hydrazide compounds or hydrazine compounds thus contain urethane groups and the groups

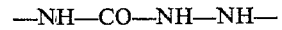

—NH—CO—NH—NH— as well as the end groups —NH—NH$_2$.

The chain lengthening agents are used in more than equivalent quantities compared with the —NCO groups determined by titration in the —NCO prepolymers, the quantities being preferably about 103 to 115 mols percent. Thus, for each —NCO group in the prepolymer there is more than one

group. The greater the degree of branching produced in the —NCO prepolymers during their formation, the greater will be the excess of chain lengthening agent that must be used in order to obtain, at the same concentration, polymer solutions having comparable viscosities. To produce highly viscous polymer solutions suitable for dry spinning by the process according to the invention, it has been found particularly advantageous to use such an excess in Stage(b) that the polymer solutions reach viscosities of 50–200 P/20°.

The chain lengthening agents may be dissolved in highly polar solvents, such as, dimethylformamide, if desired at elevated temperatures. In a number of hydrazide compounds, a mixture of dimethylformamide with up to about 10% water is more suitable for a solution. It was found that in the reaction with —NCO prepolymers, the reaction of the —NCO groups with water, which would theoretically be possible, occurs to only a very slight extent since the reaction between aromatic diisocyanates and hydrazides, e.g., carbodihydrazide, takes place much more rapidly.

The reaction between —NCO prepolymers and excess chain lengthening agents may be carried out continuously or intermittently. For example, the —NCO preliminary addition product may be added in the form of a melt or in the form of an approximately 50% to 90% solution in an inert solvent into a prepared solution of chain lengthening agent, which may be heated, and the components are stirred while being added together. If, on the other hand, a solution of chain lengthening agent is added to a solution of —NCO preliminary addition product, the components must be added and mixed very rapidly in order that the excess of chain lengthening agent may have the desired effect of breaking off the polymer chain.

This reaction is most reliable if carried out continuously, in which case the two components are added by means of a suitable dosing apparatus in a relatively small reaction chamber in which they are subjected to intensive mixing. The viscous molten prepolymer or the solution thereof may be dosed by means of gear wheel pumps and the solution of the chain lengthening agent may be added to the mixing and reaction chamber by means of piston pumps or membrane pumps, if desired, through injection nozzles with a relatively high aperture pressure (5 to 150 atmospheres above atmospheric pressure). The reaction and mixing chamber may either be a system of two interconnected worms (so-called double worm) or a cylindrical reaction vessel in which the components are mixed by means of a cylindrical stirrer with radical pins using a high stirring velocity (e.g., 500 to 2,000 r.p.m.). Other mixing apparatus may be used, for example, a cylindrical reaction vessel with a cylindrical displacing element situated at the center and a spiral stirrer rotating in the gap between this element and the wall has been found to be a particularly suitable arrangement. The highly viscous —NCO prepolymer in the form of a melt or solution is preferably introduced through thin gaps or apertures so that it will dissolve rapidly in the reaction solution. The components remain in the mixing chamber for about 5 to 150 seconds, at the end of which time the reaction between the components is practically complete and a moderately viscous solution of polymers with a relatively high number of NH—$NH_2$ end groups is produced. Apparatus such as described in German patent specification 1,114,313 in which the components are mixed in a microinjection chamber for only fractions of a second are also suitable for the preparation of the polymer solution.

The polymer may be pigmented after the above reaction by stirring a suitable quantity of pigment paste into the viscous polymer solution, or alternately the pigment is added to one of the two reaction components before the chain lengthening reaction, the paste being preferably added to the solution of chain lengthening agent. In the continuous process, the pigment paste may be introduced continuously into the mixing and reaction vessel.

The pigments are preferably white pigments, such as, titanium dioxide (rutile), used in a finely divided form in quantities of about 0.1% to 10%. Other pigments, e.g., on a silicate basis, or other colorless or colored inorganic or organic pigments may also be incorporated. Compounds such as magnesium stearate, zinc palmitate, stannous stearate or other salts of higher fatty acids may also be added to the polymer solution.

The polymer solutions obtained in the continuous process, which vary in viscosity and molecular weight owing to inaccuracies in dosing, are preferably collected in a suitable storage vessel and homogenized by stirring.

The polymer solutions obtained from —NCO prepolymers and excess quantities of chain lengthening agents are practically stable when stored at room temperature.

For the subsequent "processing reaction," polyisocyanates are used which are less reactive than the diisocyanates previously used. Particularly suitable are aliphatic polyisocyanates, such as, for example, 1,4-tetramethylene diisocyanate, 1,6-hexamethylenediisocyanate, 1,4-cyclohexanediisocyanate, 4,4′ - dicyclohexylmethanediisocyanate, 3,3′ - dipropylether diisocyanate, 3,3′-dipropylthioetherdiisocyanate. Mixed aromatic and aliphatic diisocyanates, e.g., 4,4′-1,2,3,4,5,6-hexahydrodiphenylmethanediisocyanate may also be used. Aromatic diisocyanates substituted by several alkyl- or alkoxy groups, preferably adjacent to the —NCO groups, e.g., 1,3,5-triisopropyl-2,4-benzenediisocyanate, 3,3′,5,5′-tetraethyl-diphenylmethane-4,4′-diisocyanate, 3,3′-dimethoxy, 5,5′ - diethyl - diphenylmethane-4,4′-diisocyanate are also suitable. The diisocyanates may be converted to products containing terminal —NCO groups by means of low molecular weight polyhydroxyl compounds, such as, trimethylol propane. Additional branching is thus incorporated in the processing reaction, with the result that the viscosity and molecular weight rise more steeply than when difunctional isocyanates are used. Another useful polyisocyanate in this step is the biuret triisocyanate prepared from 3 mols of hexamethylene diisocyanate according to British specification 876,503.

Reaction products of high molecular weight polyhydroxyl compounds and excess quantities of the above polyisocyanates may also be used in the "processing stage." The quantity of polyisocyanate then used should not be greater than the equivalent of the terminal NH—$NH_2$ groups.

The reaction is generally carried out by a very simple method: The slowly reacting polyisocyanates are added as such or as solutions in inert solvents to the solution of polymers from Stage (b) and distributed by stirring in the moderately viscous mass. This can generally be completed in a few minutes. As a result of the reaction with the polymers which contain terminal NH—$NH_2$ groups, which now slowly sets in, the polymer molecules increase in size and the viscosity of the solution, therefore, slowly rises, and this increase may be controlled continuously by suitable measuring apparatus. If desired, the polyisocyanates may be added intermittently, the end point of the reaction being reached each time before a further amount of polyisocyanate is added.

The increase in viscosity of the polymer solution and in the molecular weight of the dissolved polymers is generally allowed to increase until the viscosity rises to about 300 to 1,000 P/20°, which is the preferred range for the dry spinning process, the concentration of the spinning solution being preferably 24% to 34% by weight.

Commercially it is very advantageous if the quantity of polyisocyanate compounds in the "processing reaction" is extremely low relative to the reaction components at the beginning, so that no concentration shifts will occur.

In order to obtain good elastic properties in the finished product, the molecular weight of the polymers after the "processing reaction" should be high enough for the so-called internal viscosity to be about $$[\eta] = \frac{\ln \eta_r}{c} = 0.9$$

when the polymer is dissolved at 20° C. to give a concentration of $c=1$ g./100 cc. in phosphoric acid-tri-dimethylamide. The [η]-values of the polymers of Stage (b) are generally much lower, lying approximately between 0.45 and 0.85.

For the sake of the thermostability of the polymers it is in many cases desirable finally to remove the remaining terminal —NH—NH₂ groups. This may most simply be done by adding appropriate quantities of monofunctional acylating compounds, e.g. methylisocyanate, n-butylisocyanate, cyclohexylisocyanate, ω-chlorohexylisocyanate, cyclohexylisocyanate, n-octyl-isocyanate, phenylisocyanate, toluyl isocyanate, chlorophenyl isocyanate, pyrocarbonic acid ethyl ester, pyrocarbonic acid butyl ester, pyrocarbonic acid methyl ester, phthalic anhydride, acetic anhydride, maleic anhydride, ketene, dimethylketene, diphenylketene, diphenylcarbodiimide, dicyclohexylcarbodiimide and the like. When incorporating isocyanates with long hydrocarbon chains ($C_8$–$C_{24}$), e.g., stearyl isocyanate, filaments with relatively low surface adhesion are obtained.

By adding agents which protect against light and oxidation, the elastomers may be made more stable against light, oxygen and ozone and/or against the action of oxidizing gases.

The following compounds or classes of compounds which may also be used as mixtures, may be mentioned as examples of such agents: phenyl-β-naphthylamine, dinaphthyl - p - phenylenediamine,phenothiazine, mercapto-2-imidazoline, 2-mercaptobenzimidazole, 2-(2'-hydroxy-5'-methyl-benzene)-benztriazole, 2-methyl-1,3-diphenyl-imidazolidine, 1,3 - diphenyl - hexahydropyrimidine, 1-mercaptoethanol - 2, 1,10-dimercaptodecane, thiourea, o-aminothiophenol, phosphites, such as, triphenylphosphite, diphenyl - nonylphosphite, diphenylphosphite, tartaric acid, crotonaldehyre - 2,4 - dinitrophenylhydrazone. Carbon black generally also has a good antioxidant effect. However, in the production of colorless elastomers it is preferable to use stabilizers which are colorless or not decolorizing and which have a partly synergistic enhancement of the effect in mixtures (DAS 1,196,490 and 1,117,856). Particularly suitable are derivatives of benzophenone or diphenylmethane which have been substituted by hydroxyl groups, e.g., 2,2'-dihydroxy-4-methoxybenzophenone,
2,2'-dihydroxy-4,4'-dimethoxybenzophenone,
2,2',4,4'-tetrahydroxybenzophenone,
2,2',4-trihydroxy-5-tertiary-butyl-benzophenone and
  2-benzyl-6-tertiary-butylphenol,
2,6-diisopropyl-p-cresol,
2,4-dimethyl-6-tertiary-butylphenol,
2,2'-methylene-di-(6-tertiary-butyl-4-methyl-phenol),
4,4'-di-(6-tertiary-butyl-m-cresol)-sulphide,
2,6-diisopropyl-4-methyl-phenol,
2,5-di-tertiary-butyl-hydroquinone,
2-cyclohexyl-6-tertiary-butyl-phenol,
2,6-di-tertiary-butyl-4-methyl-phenol,
4,4'-dimethoxy-3,5-di-tertiary-butyl-benzophenone,
4-hydroxy-3,5-di-tertiary-butyl-4'-methoxy-benzophenone,
1-mono-acetyl-4-benzoyl-resorcinol,
3,4-tri-(α-methyl-benzyl)-phenol.

Aliphatic primary secondary or tertiary amines are also suitable as stabilizers, e.g., dihydro-abiethylamine, and in particular amine or amide polymers such as polyethylene imine or poly - N,N - dimethyl-β-amino-ethylmethacrylate. A very good stabilizing effect is also obtained by using hydrazide compounds according to U.S. application Serial No. 264,776 or by using compounds which contain the ethylene imide group according to U.S. application Serial No. 257,749, now abandoned. The incorporation of piperazine for example into polyester components also increases the resistance to light.

The agents which render the product more stable to light, oxidation, ozone or discoloration may be added in quantities of about 0.1% to 7%, preferably into the solutions of the polymers after reaction Stage (c) has been completed. Some stabilizers, particularly the phenolic stabilizers, may be added earlier, in reaction Stages (b) or (c). The stabilizers may also be applied to the finished elastomers by a process of immersion or spraying or dusting. Pigments such as titanium dioxide in many cases have a synergistic action with the above mentioned stabilizers, thereby increasing the resistance to light. Other dyestuffs, dyestuff pigments and so-called "optical brightening agents" may be added to the solution.

Discoloration of the elastomers due to various factors may be effectively countered by treatment with salts of tin, beryllium and antimony according to U.S. application Ser. No. 240,749, now abandoned.

The resistance of the elastomers to hydrolysis is increased by the addition of carbodiimides or polycarbodiimides.

By introducing into the elastomer solutions suitable substances which have a cross-linking effect at higher temperatures, such as, substances that split off polyisocyanate, or polyethylene imides or polyepoxides, the elastomers obtained after the deformation reaction, particularly after a preliminary stretching process, may be subjected by heating to a subsequent cross-linking reaction.

Highly elastic foils with high tear strength and high resistance to further tearing and a high modulus of elasticity and good surface properties may be obtained from the solution of elastomers by means of suitable dispensers or pouring apparatus, the solvents being removed by evaporation. These foils may be cut into bands or threads, and this may be preceded, if desired, by after-treatments such as, stretching and heat treatment or reactions which release further cross linking processes.

When the solution is applied to textiles, for example, by means of doctor rollers or by spraying, excellent abrasion resistant coatings are obtained after evaporation of the solvent. They are non-adhesive, highly elastically deformable, and stable to hydrolysis and oxidation.

The products may be formed into highly elastic fibers or foils by means of nozzles in a wet or dry spinning process. In the wet spinning process, the highly viscous solution may be spun into hot water of aqueous solvent mixtures, e.g., with certain amounts of dimethylformamide, dimethylsulphoxide or glycol. For controlled fiber formation, it is sometimes advantageous to add to the spinning solution, in addition to the highly polar solvents, such as, dimethylformamide, up to about 40% of inert solvent, such as, dioxane, chlorobenzene, nitrobenzene, m-cresol, benzyl alcohol or tetrachlorethane. The solvents are completely removed from the fibers by intensive washing which may be preceded by standing them in hot water. The fibers may be stretched during the spinning process by altering the doffing speed at the nozzle or by subsequently stretching them between stretching rollers. The stretching may subsequently be fixed by heat, for example, at temperatures between 100° and 150° C. This improves a number of the properties of the fibers, particularly the modulus of elasticity.

In the dry spinning process, the solvents may be spun at viscosities of at least 300 P/20° through nozzles in a shaft of about 4 to 5 meters heated to about 150° to 250° C. into which air or nitrogen is blown in at about 150° to 300° C., multifilament threads with low individual deniers being obtained by using multiaperture nozzles. By suitably controlling the spinning process, the individual fibers may either be obtained separately or alternatively they may be allowed to come into light contact with one another at the bottom end of the shaft or after leaving the shaft, so that an apparently monofilic thread is obtained which may, however, be separated into its individual threads by mechanical means. The drawing off speed in the drying process is about 60 to 600 meters per minute, and is thus considerably higher than in the wet spinning process, which only allows drawing off speed of about 5 to 50 meters per minute.

Before the thread is wound, a preparation is applied to it to prevent it sticking to the package on the spools. The individual fibers may be prevented from sticking together, for example, by blowing talcum or silica gel into the spinning shaft. Threads that can easily be wound may also be obtained by passing them through talcum or suspensions of talcum in solvents such as methanol. The threads may be improved in a similar way by means of stearyl alcohol or palmitic acid. Metal salts of fatty acids with about 10 to 26 atoms, e.g., sodium stearate, magnesium stearate, aluminum palmitate or tin stearate when applied, for example, in the form of a suspension in a relatively volatile solvent, such as, alcohol or petroleum ether, are also suitable for treating threads for textile processes. Textile preparations which contain oil are also suitable. Mineral oils, silicone oils, sulphonated oils, preferably mixed with other compounds, such as, salts of alkanoamino fatty acids, polyethylene oxides or polypropylene oxides or their copolymers, ground nut oils and acetylation products of castor oil are examples of such textile preparations. Particularly advantageous combinations are obtained from oily preparations with finely dispersed fatty acid salts (about 2% to 20%), such as, sodium stearate, magnesium stearate, tin palmitate or talcum, which may be in the form of a dilute suspension. The amount applied to the threads generally lies between 3% to 15% by weight.

The elastomer threads may be stretched during or after the spinning process, preferably by about 50% to 150%. To fix the threads after they have been stretched, they may be heat treated under tension (e.g., on spools) for example, by heating them to about 100° to 150° C. If desired, the threads may be stretched and fixed by a continuous process in which the threads are stretched between rollers rotating at different speeds and fixed over rollers with a large surface area heated to 130° to 200° C. and then wound.

The elastic properties of the elastomer threads are advantageously modified by this stretching and heat treatment. In particular, the modulus of elasticity is increased and the shrinking on boiling is considerably reduced.

By simultaneously cross-linking the threads with polyethylene imide compounds and subjecting them to a preliminary stretching process according to the process of the application set forth above, elastomer threads are obtained which are insoluble in solvents such as dimethylformamide and which have improved elastic properties, particularly improved elastic recoil after stretching of the threads.

The highly viscous solutions obtained by the process according to the invention may be spun through suitable nozzles with another thread forming solution, e.g., polyacrylonitrile, in dimethylformamide from suitable nozzles to obtain a two-component thread according to Belgian patent specification 586,958.

Suitable elastomer substances obtained by removing the solvent by evaporation and coagulation may be formed into threads or foils by melt spinning process or by extrusion.

The highly elastic threads obtained by spinning processes from the elastomer solutions have excellent strength, high elastic elongation (200% to 900%), relatively high moduli of elasticity and good elastic recoil after repeated stretching. As the threads are very abrasion resistant and resistant to oxidation and cosmetic oils and are easily dyed, they may advantageously be used instead of threads of vulcanized rubber for producing rubber elastic fabrics of many different types.

These fabrics are suitable for use particularly in the corset industry for making elastic bands, stocking edges, surgical stockings and swimming costumes.

The highly elastic polyurethane fibers may be mixed in a proportion of 3% to 50% with ordinarily textile fibers, in which the elastomer threads may be in a more stretched state. Fabrics with high elasticity, good crease resistance and a reduced tendency to pilling may thereby be obtained.

The invention is further illustrated but not limited by the following examples in which parts are by weight unless otherwise specified.

EXAMPLE 1

Reaction Stage (a).—About 12,000 parts of an adipic acid-ethyleneglycol-butanediol (1:1) copolymer ester (OH number 57.8, acid number 1.0) are dewatered in vacuo (20 mm. Hg) at 125 to 130° C. for one hour, and after cooling down to about 70° C., treated with about 2760 parts 4,4'-diphenylmethane diisocyanate and about 3720 parts anhydrous dioxan and stirred. The reaction mixture is heated for about 100 minutes to an internal temperature of about 97 to 99° C. and then cooled rapidly to room temperature. The isocyanate content of the prepolymer, as determined by titration, is 2.05%.

Reaction Stage (b).—About 410 parts of carbodihydrazide are dissolved in about 34,060 parts dimethylformamide at about 70° C., and 1100 parts of an approximately 33% paste of titanium dioxide (rutile) in dimethylformamide is stirred into the solution. About 17,280 parts of the NCO prepolymer is stirred into the above solution, which is at a temperature of 60 to 70° C., within about 15 minutes. A homogeneous solution of increasing viscosity is obtained. At a concentration of 21.6% the solution has a viscosity of 112 P/20° C. when cooled.

Reaction Stage (c).—About 50,000 parts of the polymer solution of Stage (b) are treated with about 42.5 parts hexamethylene diisocyanate in about 150 parts by volume dioxan. The viscosity rises slowly and after about 45 minutes the viscosity of the solution is 605 P/20°.

The remaining free terminal hydrazide groups are removed by the addition of excess pyrocarbonic acid-diethyl ester (20 parts).

This polymer solution is spun into threads by the dry spinning process by spinning the solution through a nozzle plate with 16 apertures of 0.2 mm. diameter into a shaft 4.5 m. in length and heated to about 215° C., and introducing a current of air heated to about 290° C. above the nozzle. The temperature near the nozzle plate is about 140 to about 160° C.

The individual threads are brought into contact on leaving the shaft and are observed to adhere slightly to one another. The thread is drawn out of the shaft at a speed of about 93 m. per minute, and after running over a treatment roller where it is treated with a methanolic talcum suspension it is wound at a speed of 94 m. per minute and thereby stretched by 50 to 100% and then heated on spools at 125 to 130° C. for one hour.

Before measurement, the threads are washed for about 20 minutes in a solution of a neutral detergent heated to about 40° C. to remove the talcum. The modulus/300 describes the measured tensile force in g./den. on the first and third stretching of the elastomer thread by 300% at a stretching speed of 400% per minute. The elastic recoil is measured after stretching the thread three times by 300% for 30 seconds after releasing the thread (the so-called "permanent elongation" is 100-elastic recoil).

| Preliminary Elongation, Percent | Titre (den.) | Tenacity (g./den.) | Elongation, Percent | Modulus/300 (g./den.) | Elastic Recoil, Percent |
|---|---|---|---|---|---|
| 0 | 190 | 0.54 | 760 | 100/88 | 87 |
| 50 | 127 | 0.55 | 700 | 134/106 | 87 |
| 100 | 104 | 0.55 | 580 | 200/160 | 86 |

About 1.5% of hexamethylene - di - (ethyleneimide-urea), calculated on the amount of solid substance, was added to a part of the solution and the solution was spun in the same way as described above and heated for one hour at 125 to 130° C. on the spools.

| Preliminary Elongation, Percent | Titre (den.) | Tenacity (g./den.) | Elongation, Percent | Modulus/300 (g./den.) | Elastic Recoil, Percent |
|---|---|---|---|---|---|
| 0 | 225 | 0.64 | 725 | 105/85 | 89 |
| 50 | 160 | 0.84 | 640 | 150/120 | 89 |
| 100 | 125 | 0.73 | 590 | 215/165 | 88 |

EXAMPLE 2

Reaction Stage (c).—About 1000 parts of the polymer solution of Stage (b) obtained according to Example 1 is treated stepwise at room temperature with increasing quantities of 1,6-hexamethylene-diisocyanate (dissolved in a small quantity of dioxan), and the viscosity of the solution is measured 4 to 5 minutes after addition of the aliphatic polyisocyanate.

| Parts hexamethylene diisocyanate | Calculated conversion, percent of the terminal hydrazide groups | Viscosity, P/20° | $[\eta]$ |
|---|---|---|---|
| 0 | 0 | 112 | 0.76 |
| 0.150 | 15 | 140 | |
| 0.250 | 25 | 165 | |
| 0.400 | 40 | 220 | |
| 0.550 | 55 | 320 | |
| 0.700 | 70 | 410 | |
| 0.800 | 80 | 520 | 1.02 |
| 0.850 | 85 | 600 | |

EXAMPLE 3

Preparation of a polyisocyanate as starting material.—A polyisocyanate is prepared by treating 1,6-hexamethylene diisocyanate with less than the molar quantity of water. It has substantially the structure of a trifunctional biuret isocyanate. A 75% solution in toluene contains 15% NCO.

Reaction Stage (c).—When this polyisocyanate is added stepwise instead of hexamethylene diisocyanate in Example 2, there is a steeper increase in viscosity than when the solution is treated with 1,6-hexamethylene diisocyanate according to Example 2.

| Parts biuret-triisocyanate solution (15% NCO) | Calculated conversion, percent of terminal hydrazide | Viscosity, P/20°, measured 45 minutes after addition of the isocyanate |
|---|---|---|
| | 0 | 112 |
| 0.69 | 20 | 245 |
| 1.03 | 30 | 340 |
| 1.55 (calculated 3.44) | 45 | 610 |

The remaining hydrazide groups are removed by adding 2.25 parts stearyl isocyanate. No change in viscosity is then observed.

Test for comparison with Examples 1 to 3.—If the polymer solution in reaction Stage (c) is treated under the same conditions with further NCO addition product (product of reaction Stage (a)), then after adding less than 50% of the calculated quantity of NCO addition product there is already an immediate rise in viscosity and a solution is obtained which contains portions of gel, and on adding further quantities this solution is cross-linked into a gel which cannot be spun.

| NCO preliminary addition product (2.05% NCO) | Calculated conversion, percent of terminal hydrazide groups | Solution Viscosity, P/20° |
|---|---|---|
| 0 | | 112. |
| 6.2 | 25 | Not homogeneous, approximately 300-400 P. |
| 12.5 | 50 | Strongly gelatinized, 500 P. |
| 18 | 70-75 | Gel. |

EXAMPLE 4

Reaction Stage (a).—About 500 parts of a polyester (hydroxyl content 2.0%) of adipic acid, 1,6-hexanediol and 2,2-dimethyl-1,3-propanediol (glycols in the molar ratio 6:4) dewatered in vacuo at about 130° C. are treated at about 70° C. with about 117.6 parts diphenylmethane-4,4'-diisocyanate and then heated for about 60 minutes to 98 to 100° C. The prepolymer is then diluted with about 618 parts of dioxan and cooled to about 20° C. The NCO content determined by titration is 1.2%.

Reaction Stage (b).—About 1100 parts of the solution of NCO prepolymer are poured within a few minutes into a solution, heated to about 75° C. of about 15.7 parts of carbodihydrazide in about 905 parts dimethylformamide, the solution being vigorously stirred in the process. When addition is completed, about 42.5 parts of a 33% paste of titanium dioxide in dimethylformamide are stirred into the viscous solution. The homogeneous solution has a viscosity of 140 poises at 20° C., $[\eta]=0.79$.

The quantity of carbodihydrazide is 10% greater than calculated for the quantity of NCO in the prepolymer.

Reaction Stage (c).—Several portions of a solution of about 6.54 parts of 1,6-hexamethylene diisocyanate in 50 parts by volume dioxan are introduced into about 1040 parts of the solution obtained and the viscosity is measured 45 minutes after each addition.

| Parts by volume of hexamethylene diisocyanate solution added | Calculated conversion of the terminal hydrazide groups in percent | Viscosity Poises | $[\eta]$ |
|---|---|---|---|
| 2 | 20 | 204 | 0.86 |
| 2 | 40 | 368 | 0.92 |
| 2 | 60 | 978 | 1.00 |

The completely treated 28.8% homogeneous smoothly flowing solution can be spun in a dry spinning cell through a 16 aperture at about 250° C. and about 70 m. per minute. The thread is treated with a suspension of tin palmitate in mineral spirits, stretched by 100% before being finally wound, and then heated on the spool for about one hour at about 130° C.

The 134 den. thread tears under a weight of 108 g. (0.81 g. per den.) and is stretched by 540% in the process. The tension required for stretching the thread by 300% (after stretching three times) is 0.2 g. per den. The elastic recovery after this stretching is 89%.

EXAMPLE 5

Preparation of a polyisocyanate as starting material.—About 100 parts of the polyester of adipic acid, 1,6-hexanediol and 2,2-dimethyl-1,3-propanediol described in Example 4 are dewatered and heated with about 19.3 parts of 1,6-hexane-diisocyanate for about 5 hours at about 100° C. to bring the NCO content to the required amount of 3.9%. About 20 parts of the addition product are dissolved in dioxan to give about 50 parts by volume of solution.

Reaction Stage (c).—About 1000 parts of elastomer solution from Example 4 are treated in the same way as in Example 4 with portions of the polyisocyanate prepared as described above, and the increase in viscosity is measured 45 minutes after each addition.

| Parts by volume polyisocyanate | Calculated conversion of terminal hydrazide groups in percent | Viscosity Poises | $[\eta]$ |
|---|---|---|---|
| 5 | 11.5 | 167 | 0.84 |
| 5 | 23 | 225 | 0.88 |
| 10 | 46 | 607 | 0.94 |

The solution prepared is spun in the dry spinning cell as in Example 4 and under the same experimental conditions. The thread, stretched by 100% in the spinning process, is heated for one hour at about 130° C.

A 147 den. thread tears under a weight of 104 g. (0.71 g./den.), and is stretched by 570% in the process. The force required for stretching the thread to 300% is 0.17 g./den. and the elastic recovery after this stretching is 88%.

EXAMPLE 6

About 100 parts of a polyester of ethylene glycol, butylene glycol-1:4 (molar ratio 1:1) and adipic acid (reaction number=OH-number plus acid number 56) are dewatered by heating to about 130° C. at about 12 mm. Hg for one hour. The anhydrous polyester is then heated with about 22.3 parts 4,4'-diphenylmethane diisocyanate for about 60 minutes to about 100° C. and dissolved in about 100 parts of dry dioxan. The NCO content of the solution is 1.33%.

Reaction Stage (b).—About 5.65 parts diglycollic acid-dihydrazide (M.P. 179–180° C.) are introduced into about 200 parts dimethylformamide at about 100° C. About 200 parts of the NCO prepolymer are poured into the solution of the chain lengthening agent with thorough stirring. The viscosity of the resulting solution is 150 poises at 20° C.

Reaction Stage (c).—The solution which contains the terminal CO—NH—NH$_2$ groups is treated at intervals of 45 minutes four times with about 4.0 parts and twice with about 2 parts of a solution of about 0.41 part of 4,4'-dicyclohexyldiisocyanate in about 10 parts dioxan. The viscosity of the elastomer solution, which has a solids content of 25% is 560 poises at 20°.

The diglycollic acid hydrazide used as chain lengthening agent is obtained by boiling the ethyl ester and alcohol with hydrazine hydrate. Yield 88%, M.P. 179–180°. $C_4H_{10}N_4O_3$ (162.2)—Calculated: C, 29.62; H, 6.22; O, 29.60. Found: C, 29.92; H, 6.32; O, 29.93.

A foil obtained by pouring the solution out to form a layer of 0.5 mm. thickness and evaporating the solvent has the following properties:

| | |
|---|---|
| Thickness _____mm__ | 0.11 |
| Tenacity _____kg./cm$^2$__ | 330 |
| Elongation _____percent__ | 660 |
| Tension at 20% elongation _____kg./cm$^2$__ | 25 |
| At 300% elongation _____kg./cm$^2$__ | 82 |
| Resistance to further tearing (according to Graves) _____kg./cm__ | 43 |
| Microhardness _____ | 56 |

EXAMPLE 7

Reaction Stage (a).—500 parts of a polytetramethylene glycol ether (molecular weight 800) are reacted with 54.4 parts of 2,4-toluylene diisocyanate and 95 parts of chlorobenzene for one hour at 85 to 90° C. Heating is continued after addition of 133 parts of 4,4'-diphenyl methane diisocyanate and 200 parts of chlorobenzene for one hour at 95 to 98° C. After cooling of the reaction mass to room temperature it contains 1.44 percent NCO.

Reaction Stage (b).—800 parts of the solution of NCO-prepolymer are poured within 10 minutes at 3° C. into a solution of 7.39 parts of hydrazine hydrate dissolved in 1333 parts of dimethylformamide. 22.75 parts of titanium dioxide (Rutil) are then added. The homogeneous solution has a viscosity of 85 poise/20° C.

Reaction Stage (c).—The solution which contains terminal —NH—CO—NH—NH$_2$— groups has been added thereto 1.5 parts of hexamethylene diisocyanate at 45° C. The viscosity increases within 25 minutes to 580 poise/20° C. A foil obtained by pouring the solution out onto glass plates shows a tenacity of 0.85 den. at an elongation of 740 percent. The foil has an elastic recovery of 85 percent after three times extension to 300 percent and 30 seconds resting time after relaxation. The polymer solution can also be spun according to the dry spinning procedure to fibers with elastic properties.

It is of course to be understood that the scope of the invention is not limited by the examples but that any of the reactants such as the substantially linear polyhydroxyl compounds, the organic polyisocyanates and the chain extenders set forth above may be used in place of those specifically used.

Although the invention has been described in considerable detail for the purpose of illustration, it is to be understood that variations can be made by those skilled in the art without departing from the spirit of the invention and scope of the claims.

What is claimed is:

1. A process for the manufacture of solutions of polyurethane polymers which comprises (1) reacting an NCO terminated prepolymer prepared by reacting an excess of an aromatic diisocyanate with a substantially linear dihydroxy organic polymer having a molecular weight of from about 650 to about 5000, with an excess of a member selected from the group of hydrazides and hydrazines, said reaction occurring in an organic polar solvent that dissolves polyacrylonitrile, and (2) reacting the product of step (1) with a quantity of an organic polyisocyanate up to that equivalent to react with the reactive groups of said product, the NCO groups of said organic polyisocyanate having a reactivity less than that of an unhindered NCO group bonded to a benzene ring.

2. The process of claim 1 wherein the hydrazide contains at least two —NH—NH$_2$ groups.

3. The process of claim 1 wherein the hydrazide is carbodihydrazide.

4. The process of claim 1 wherein the hydrazide is diglycollic acid-dihydrazide.

5. The process of claim 1 wherein the hydrazide is cyanuric acid dihydrazide.

6. The process of claim 1 wherein the aromatic diisocyanate is toluylene diisocyanate.

7. The process of claim 1 wherein the aromatic diisocyanate is 4,4'-diphenylmethane diisocyanate.

8. The process of claim 1 wherein the organic polymer is a dihydroxy polyester, the aromatic diisocyanate is 4,4'-diphenylmethane diisocyanate, the hydrazide is carbodihydrazide, the polar solvent is dimethylformamide and the organic polyisocyanate is hexamethylene diisocyanate.

9. The process of claim 1 wherein said organic polar solvent is selected from the group consisting of dimethylformamide, dimethylacetamide, dimethylsulphoxide, hexamethylphosphoramide, tetramethylenesulfone, N-methylpyrrolidone and tetramethylurea.

10. The process of claim 1 wherein the substantially linear dihydroxy organic polymer is selected from the group consisting of dihydroxy polyesters, polyalkylene ether glycols, polythioether glycols and dihydric polyacetals.

11. The process of claim 10 wherein the substantially linear dihydroxy organic polymer is a polyester.

12. The process of claim 10 wherein the substantially linear dihydroxy organic polymer is a polyalkylene ether glycol.

13. The process of claim 1 wherein the organic polyisocyanate having NCO groups of less reactivity than an unhindered NCO group bonded to a benzene ring is an aliphatic diisocyanate.

14. The process of claim 13 wherein the organic polyisocyanate having NCO groups of less reactivity than an unhindered NCO group bonded to a benzene ring is hexamethylene diisocyanate.

15. The process of claim 13 wherein the organic polyisocyanate having NCO groups of less reactivity than an unhindered NCO group bonded to a benzene ring is dicyclohexyldiisocyanate.

16. The process of claim 13 wherein the organic polyisocyanate having NCO groups of less reactivity than an unhindered NCO group bonded to a benzene ring is the biuret triisocyanate derived from 3 mols of hexamethylene diisocyanate and 1 mol of water.

17. The process of claim 1 wherein said group member is hydrazine, carbazinic acid, carbodihydrazide and a carboxylic acid dihydrazide.

18. The process of claim 17 wherein the group member is an aliphatic carboxylic acid dihydrazide.

19. A process for the manufacture of solutions of polyurethane polymers which comprises (1) reacting an NCO terminated prepolymer prepared by reacting an excess of an aromatic diisocyanate with a substantially linear dihydroxy organic polymer having a molecular weight of from about 650 to about 5000, with an excess of a member selected from the group of hydrazides and hydrazines, said reaction occurring in an organic polar solvent that dissolves polyacrylonitrile, (2) reacting the product of Step (1) with a quantity of an organic polyisocyanate less than sufficient to react with all of the product, the NCO groups of said organic polyisocyanate having a reactivity less than that of an unhindered NCO group bonded to a benzene ring and (3) reacting the remaining active groups of the product with a monofunctional acylating compound selected from the group consisting of organic monoisocyanates, carboxylic acid anhydrides and pyrocarbonic acid lower alkyl esters.

20. A process for the manufacture of solutions of polyurethane polymers which comprises (1) reacting an —NCO terminated prepolymer prepared by reacting an excess of an aromatic diisocyanate with a substantially linear dihydroxy organic polymer having a molecular weight of from about 650 to about 5000 and selected from the group consisting of dihydroxy polyester, polyalkylene ether glycols, polythioether glycols and dihydric polyacetals with an excess of a hydrazide having the general formula selected from the group consisting of R—NH—NR'—A—(Z—A)$_n$—NR'—NH—R wherein A is a member selected from the group consisting of —CO—, —CS—, and —SO$_2$—; R and R' are selected from the group consisting of hydrogen, alkyl and aryl; with the proviso that at least twice in the molecule R and R' represent hydrogen; Z is a radical selected from the group consisting of alkylene, arylene, aralkylene, —NH—, NH—NH—, —OYO—,
and —NH—Y—NH— wherein Y is a divalent organic radical selected from the group consisting alkylene and phenylene and $n$ is a member selected from the group consisting of 0 and 1 and

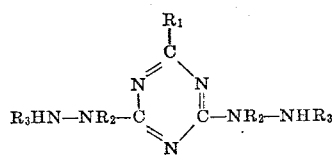

wherein R$_1$ is selected from the group consisting of hydrogen, chlorine, —OR$_2$, —NR$_2$R$_3$, alkyl, aryl, aralkyl and cycloalkyl and R$_2$ and R$_3$ are members selected from the group consisting of hydrogen, alkyl, aryl, aralkyl and cycloalkyl; said reaction being conducted in a polar solvent selected from the group consisting of dimethylformamide, dimethylacetamide, dimethylsulphoxide, hexamethylphosphoramide, tetramethylenesulfone, N-methylpyrrolidone and tetramethylurea, and (2) reacting the product of Step (1) with a quantity of an organic polyisocyanate up to that equivalent to react with all of the reactive groups of said product, the NCO group of said polyisocyanate having a reactivity less than that of an unhindered NCO group bonded to a benzene ring.

21. A process for the manufacture of solutions of polyurethane polymers which comprises (1) reacting an —NCO terminated prepolymer prepared by reacting an excess of an aromatic diisocyanate with a substantially linear dihydroxy organic polymer having a molecular weight of from about 650 to about 5000 and selected from the group consisting of dihydroxy polyester, polyalkylene ether glycols, polythioether glycols and dihydric polyacetals with an excess of a hydrazide having the general formula R—NH—NR'—A—(Z—A)$_n$—NR'—NH—R wherein A is a member selected from the group consisting of —CO—, —CS—, and —SO$_2$—; and R and R' are selected from the group consisting of hydrogen, alkyl and aryl; with the proviso that at least twice in the molecule R and R' represent hydrogen; Z is a radical selected from the group consisting of alkylene, arylene, aralkylene,

—NH—, —NH—NH—, —OYO— and —NH—Y—NH— wherein Y is a divalent organic radical selected from the group consisting of alkylene and phenylene and $n$ is a member selected from the group consisting of 0 and 1, said reaction being conducted in a polar solvent selected from the group consisting of dimethylformamide, dimethylacetamide, dimethylsulphoxide, hexamethylphosphoramide, tetramethylenesulfone, N-methylpyrrolidone and tetramethylurea, and (2) reacting the product of Step (1) with a quantity of an organic polyisocyanate up to that equivalent to react with all of the reactive groups of said product, the NCO group of said polyisocyanate having a reactivity less than that of an unhindered NCO group bonded to a benzene ring.

22. A process for the manufacture of solutions of polyurethane polymers which comprises (1) reacting an —NCO terminated prepolymer prepared by reacting an excess of an aromatic diisocyanate with a substantially linear dihydroxy organic polymer having a molecular weight of from about 650 to about 5000 and selected from the group consisting of dihydroxy polyester, polyalkylene ether glycols, polythioether glycols and dihydric polyacetals with an excess of a hydrazide having the general formula

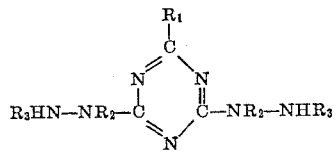

wherein R$_1$ is selected from the group consisting of hydrogen, chlorine, —OR$_2$, —NR$_2$R$_3$, alkyl, aryl, aralkyl and cycloalkyl and R$_2$ and R$_3$ are members selected from the group consisting of hydrogen, alkyl, aryl, aralkyl and cycloalkyl; said reaction being conducted in a polar solvent selected from the group consisting of dimethylformamide, dimethylacetamide, dimethylsulphoxide, hexamethylphosphoramide, tetramethylenesulfone, N-methylpyrrolidone and tetramethylurea, and (2) reacting the product of Step (1) with a quantity of an organic polyisocyanate up to that equivalent to react with all of the reactive groups of said product, the NCO group of said polyisocyanate having a reactivity less than that of an unhindered NCO group bonded to a benzene ring.

References Cited

UNITED STATES PATENTS

| | | | |
|---|---|---|---|
| 2,957,852 | 10/1960 | Frankenburg et al. | 260—75 |
| 3,054,755 | 9/1962 | Windemuth et al. | 260—2.5 |
| 3,149,988 | 9/1964 | Thurmaier | 117—138.8 |
| 3,202,636 | 8/1965 | Windemuth et al. | 260—75 |

FOREIGN PATENTS

| | | |
|---|---|---|
| 155,629 | 2/1939 | Austria. |
| 917,450 | 2/1963 | Great Britain. |
| 1,112,409 | 11/1955 | France. |
| 1,123,467 | 2/1962 | Germany. |

DONALD E. CZAJA, *Primary Examiner.*

L. J. BERCOVITZ, *Examiner.*

F. McKELVEY, *Assistant Examiner.*